United States Patent
Murakami (10) Patent No.: US 10,040,144 B2
(45) Date of Patent: Aug. 7, 2018

(54) SPOT WELDING METHOD (71) Applicant: Kobe Steel, Ltd., Kobe-shi (JP)

(72) Inventor: Toshio Murakami, Kobe (JP)

(73) Assignee: Kobe Steel, Ltd., Kobe-shi (JP)

(*) Notice: Subject to any disclaimer, the term of this patent is extended or adjusted under 35 U.S.C. 154(b) by 131 days.

(21) Appl. No.: 14/407,180

(22) PCT Filed: Jun. 24, 2013

(86) PCT No.: PCT/JP2013/067243
§ 371 (c)(1),
(2) Date: Dec. 11, 2014

(87) PCT Pub. No.: WO2014/002947
PCT Pub. Date: Jan. 3, 2014

(65) Prior Publication Data
US 2015/0174689 A1  Jun. 25, 2015

(30) Foreign Application Priority Data
Jun. 29, 2012 (JP) ................................. 2012-146480

(51) Int. Cl.
*B23K 11/36* (2006.01)
*B23K 11/11* (2006.01)
*B23K 11/24* (2006.01)

(52) U.S. Cl.
CPC ............ *B23K 11/115* (2013.01); *B23K 11/11* (2013.01); *B23K 11/24* (2013.01); *B23K 11/36* (2013.01)

(58) Field of Classification Search
CPC ......... B23K 11/36; B23K 11/24; B23K 11/11; B23K 11/115; B23K 11/315;
(Continued)

(56) References Cited

U.S. PATENT DOCUMENTS 2,401,528 A * 6/1946 Vang .................... B23K 11/248
  219/114
6,072,145 A  6/2000 Suita et al.
(Continued)

FOREIGN PATENT DOCUMENTS

JP  2-16276 U  2/1990
JP  7-178563 A * 7/1995
(Continued)

OTHER PUBLICATIONS

International Search Report dated Jul. 30, 2013, in PCT/JP2013/067243, filed Jun. 24, 2013.
(Continued)

*Primary Examiner* — Geoffrey S Evans
(74) *Attorney, Agent, or Firm* — Oblon, McClelland, Maier & Neustadt, L.L.P.

(57) ABSTRACT

A spot welding method joins metal sheets by: clamping a stacked section of two or more stacked metal sheets with a pair of electrodes at a load of 100 N or more; applying pressure around the electrodes at a load, which is 5-1000% of the load due to the pair of electrodes, using a pressurizing member, which applies pressure on the stacked section in regions that are 20% or more of the total outer circumference of the electrode tips and for which the continuous regions of the entire outer circumference of the electrode tips that are not pressed are 30% or less (including 0%) of the entire outer circumference of the electrode tips; and passing welding current from the electrodes to the stacked section.

3 Claims, 4 Drawing Sheets

(58) Field of Classification Search
CPC ..... B23K 11/255; B23K 11/312; B23K 11/31;
B23K 11/28; B23K 11/248; B23K
11/002; B23K 9/007; B23K 9/0061
USPC .......... 219/91.2, 127, 87, 89, 90, 91.1, 86.1,
219/78.01, 86.22, 86.23, 86.51, 86.7, 72
See application file for complete search history.

(56) References Cited

U.S. PATENT DOCUMENTS

| | | | |
|---|---|---|---|
| 2011/0266260 A1* | 11/2011 | Sigler | B23K 11/115 219/91.2 |
| 2012/0055910 A1* | 3/2012 | Sakai | B23K 11/115 219/127 |
| 2012/0074104 A1 | 3/2012 | Goto et al. | |
| 2012/0241416 A1* | 9/2012 | Sakamoto | B23K 11/115 219/91.2 |
| 2013/0048613 A1* | 2/2013 | Sigler | B23K 11/115 219/91.2 |

FOREIGN PATENT DOCUMENTS

| | | | |
|---|---|---|---|
| JP | 7-178563 A | | 7/1995 |
| JP | 10-71475 A | | 3/1998 |
| JP | 2002-239748 A | * | 8/2002 |
| JP | 2003-236674 | | 8/2003 |
| JP | 2006-272345 A | * | 10/2006 |
| JP | 2008-246538 | | 10/2008 |
| JP | 2008-284570 A | | 11/2008 |
| JP | 2009-107000 A | | 5/2009 |
| JP | 2009-241086 | | 10/2009 |
| JP | 2012-11398 | | 1/2012 |
| JP | 2012-55924 | | 3/2012 |
| JP | 2012-55941 | | 3/2012 |
| WO | 2010/140605 A1 | | 12/2010 |
| WO | 2012/033040 A1 | | 3/2012 |

OTHER PUBLICATIONS

Written Opinion of the International Searching Authority dated Jul. 30, 2013, in PCT/JP2013/067243, filed Jun. 24, 2013.
Extended European Search Report dated Feb. 5, 2016 in Patent Application No. 13810722.2.

* cited by examiner

SPOT WELDING METHOD

TECHNICAL FIELD

The present invention relates to a spot welding method, more specifically relates to a spot welding method for joining metal sheets by clamping two sides of a stacked section of two or more stacked metal sheets by a pair of electrodes, and energizing the metal sheets by the electrodes.

BACKGROUND ART

In typical spot welding, two or more metal sheets are stacked, and two sides of a stacked section of the stacked metal sheets are clamped by a pair of electrodes. A current is then applied to the stacked section to melt a joint interface of the metal sheets through resistance heating, so that the metal sheets are joined together.

There are three major control factors in spot welding: pressure for pressing the electrodes to the metal sheets, a current value, and energization time.

Among them, the current value is a particularly important factor. If the current value is excessively low, a nugget formed after melting has a small diameter, leading to insufficient joint strength. On the other hand, if the current value is excessively high, while the nugget diameter becomes large, splash is generated, and joint strength is disadvantageously fluctuated. An optimum current range in spot welding is therefore a range from a current value above which a certain nugget diameter is secured to a current value below which splash is generated. If such an optimum current range can be expanded, spot welding is facilitated.

Various proposals have been made to expand the optimum current range in spot welding.

Existing Technology 1

For example, PTL 1 discloses a spot welding method of a high-tensile steel sheet. This method includes a first step of forming a nugget by gradually increasing a current applied to a high-tensile steel sheet, a second step of decreasing the current after the first step, and a third step of increasing the current after the second step for main welding and gradually decreasing the current.

PTL 1 describes that such a method is a modification of a two-step energization method, which is frequently used in spot welding, as a combination of preliminary energization and main energization, and the method provides effects of suppressing generation of splash, securing certain nugget diameter, increasing a splash generation limit, and the like. This method however requires complicated control, and takes long welding time, and therefore has a disadvantage of poor productivity.

Existing Technology 2

PTL 2 discloses a spot welding method in which a welding current is applied to two or more stacked members to be welded. In this method, there is used a spot welding machine that includes electrodes configured to be in contact with sections to be welded of the members to be welded to apply a current to the members, and holding components that hold the sections to be welded of the two or more stacked members to be welded to prevent the sections from being separated from each other at a position a certain distance away from the sections to be welded. The electrodes and the holding components are brought into contact with the members to be welded and pressed to the members to be welded, and a welding current is applied to the members to be welded by the electrodes, and then the electrodes are separated from the members to be welded after the lapse of cooling time for obtaining hardness of the sections to be welded. After the lapse of predetermined time from the point when the electrodes are separated from the members to be welded, the holding components are separated from the members to be welded.

In the spot welding method disclosed in PTL 2, the members to be welded are energized while being pressurized not only by the electrodes but also by the holding components different from the electrodes. Consequently, the members to be welded are still pressurized by the holding components at a position a certain distance away from the electrodes after the electrodes are separated after energization, thereby the members are prevented from being warped due to rapid cooling. Furthermore, even if high-tensile steel that shows high hardness but small elongation is welded, the high-tensile steel can be naturally cooled while being pressurized by the holding components until the sections to be welded of the members to be welded are solidified; hence, the members to be welded are gently cooled, leading to suppression of crack occurrence. However, PTL 2 makes no description on approaches for expanding the optimum current range of spot welding, such as suppressing splash generation, securing certain nugget diameter, and increasing a splash occurrence limit.

Existing Technology 3

PTL 3 discloses a spot welding method for spot-welding members to be welded that includes a thin plate, a first thick plate, and a second thick plate stacked in this order, each thick plate having a thickness larger than the thin plate. In this method, the members to be welded are clamped and pressurized by a first welding electrode to be in contact with the second thick plate, a second welding electrode to be in contact with the thin plate while being opposed to the first welding electrode, and a controlled pressurizing tool to be in contact with the thin plate while being adjacent to the second welding electrode. The members to be welded are energized between the second welding electrode and the first welding electrode while being clamped and pressurized, and thereby the members are spot-welded together.

In the spot welding method disclosed in PTL 3, the members to be welded are also energized while being pressurized not only by the electrodes but also by the controlled pressurizing tool different from the electrodes. The members to be welded are energized while being pressurized by the controlled pressurizing tool at a position adjacent to the second electrode on a thin plate side of the members to be welded as the three stacked plates including the thin plate and the two thick plates (the first thick plate and the second thick plate) stacked in order, thereby current density between the thin plate and the first thick plate becomes relatively higher. Consequently, there is formed an excellent nugget with no unevenness in amount of dilution from the thin plate to the second thick plate. However, PTL 3 makes no description on approaches for expanding the optimum current range of spot welding, such as suppressing splash generation, securing certain nugget diameter, and increasing a splash occurrence limit.

PTL 4 discloses a spot welding method in which two-step energization, two-step energization with cooling between the energization steps, or three-step energization is performed under a certain condition during energization in spot welding, as an approach for improving cross tension strength of a weld joint formed by spot-welding high-strength steel sheets together.

It is described that this method is effective for increasing cross tension strength of a spot weld joint by slowing cooling rate after typical energization for welding through post-heating energization treatment, and thereby slightly decreasing hardness of martensite formed during cooling to dull crack sensitivity. However, PTL 4 makes no description on approaches for expanding the optimum current range of spot welding, such as suppressing splash generation, securing certain nugget diameter, and increasing a splash occurrence limit. Hence, there is a limit in this method for increasing strength of the spot weld joint.

CITATION LIST

Patent Literature

PTL 1: Japanese Unexamined Patent Application Publication No. 2003-236674
PTL 2: Japanese Unexamined Patent Application Publication No. 2012-55941
PTL 3: Japanese Unexamined Patent Application Publication No. 2012-55924
PTL 4: Japanese Unexamined Patent Application Publication No. 2009-241086

SUMMARY OF INVENTION

Technical Problem

An object of the invention, which has been made to solve the above-described problems, is to provide a spot welding method that easily and securely prevents splash generation and expands the optimum current range of spot welding without need of complicated control.

Solution to Problem

According to a first invention, there is provided a spot welding method of joining two or more stacked metal sheets together by applying a welding current to a stacked section of the metal sheets, the method using a spot welding machine including a pair of electrodes configured to be in contact with two sides of the stacked section to apply a current to the stacked section, and a pressurizing member configured to pressurize the stacked section in a region corresponding to 20% or more of an entire circumferential region of a tip of each of the electrodes at a distance of 5 mm or less from an outer perimeter of the tip of the electrode, wherein a continuous unpressurized region occupies 30% or less (including 0%) of the entire circumferential region of the tip of the electrode, the method being characterized in that the metal sheets are joined together by clamping the stacked section by the pair of electrodes at a load of 100 N or more, pressurizing the periphery of each of the electrodes by the pressurizing member at a load of 5 to 1000% of a load given by the pair of electrodes, and applying a welding current to the stacked section by the electrodes.

According to a second invention, there is provided a spot welding method of joining two or more stacked steel sheets together by applying a welding current to a stacked section of the steel sheets, the method using a spot welding machine including a pair of electrodes configured to be in contact with two sides of the stacked section to apply a current to the stacked section, and a pressurizing member configured to pressurize the stacked section in a region corresponding to 20% or more of an entire circumferential region of a tip of each of the electrodes at a distance of 5 mm or less from an outer perimeter of the tip of the electrode, wherein a continuous unpressurized region occupies 20% or less (including 0%) of the entire circumferential region of the tip of the electrode, the method being characterized by having an electrode periphery pressurizing step of clamping the stacked section by the pair of electrodes at a load of 100 N or more, and pressurizing the periphery of each of the electrodes by the pressurizing member at a load of 5 to 1000% of a load given by the pair of electrodes, a main energization step of energizing the stacked section for welding by the electrodes, an energization standby step of taking energization standby time satisfying Formula (1) immediately after the main energization step, and following the energization standby step, a post energization step of post-energizing the stacked section by the electrodes such that Formulas (2) and (3) are satisfied, $$0 \leq WT \leq 200 \quad (1)$$

$$0.20 \times WC \leq PC \leq 0.90 \times WC \quad (2)$$

$$10 \leq PT \leq 200 \quad (3)$$

where WC represents welding current (kA), WT represents energization standby time (ms), PC represents post energization current (kA), and PT represents post energization time (ms).

According to a third invention, there is provided a spot welding method of joining two or more stacked steel sheets together by applying a welding current to a stacked section of the steel sheets, the method using a spot welding machine including a pair of electrodes configured to be in contact with two sides of the stacked section to apply a current to the stacked section, and a pressurizing member configured to pressurize the stacked section in a region corresponding to 20% or more of an entire circumferential region of a tip of each of the electrodes at a distance of 5 mm or less from an outer perimeter of the tip of the electrode, wherein a continuous unpressurized region occupies 20% or less (including 0%) of the entire circumferential region of the tip of the electrode, the method being characterized by having an electrode periphery pressurizing step of clamping the stacked section by the pair of electrodes at a load of 100 N or more, and pressurizing the periphery of each of the electrodes by the pressurizing member at a load of 5 to 1000% of a load given by the pair of electrodes, a main energization step of energizing the stacked section for welding by the electrodes, and immediately after the main energization step, an after-treatment step of repeating a combination N (N is 2 to 5) times such that Formula (7) is satisfied, the combination being a combination of an energization standby step of taking energization standby time satisfying Formula (4), and following the energization standby step, a post energization step of post-energizing the stacked section by the electrodes such that Formulas (5) and (6) are satisfied, $$0 \leq WTi \leq 200 \quad (4)$$

$$0.20 \times WC \leq PCi \leq 0.90 \times WC \quad (5)$$

$$10 \leq PTi \leq 200 \quad (6)$$

$$TT = \Sigma(WTi + PTi) \leq 500 \quad (7)$$

where i represents integer of 1 to N, WC represents welding current (kA), WTi represents ith energization standby time (ms), PCi represents ith post energization current (kA), PTi represents ith post energization time (ms), and TT represents total aftertreatment time (ms).

Advantageous Effects of Invention

According to the spot welding method of the first invention, the metal sheets are energized while being pressurized not only by the electrodes but also by the pressurizing member different from the electrodes at a predetermined load in a certain region near the outer perimeter of each electrode. Consequently, a melt is prevented from jumping out from a space between the metal sheets, and thereby generation of expulsion at edge can be prevented. In addition, the periphery of the electrode is first cooled, and thereby generation of surface flash is prevented. As a result, the optimum current range of spot welding can be expanded.

According to the spot welding method of each of the second and third inventions, the steel sheets are subjected to main energization while being pressurized not only by the electrodes but also by the pressurizing member different from the electrodes at a predetermined load in a certain region near the outer perimeter of each electrode, and then are subjected to post energization under a certain condition. Consequently, during the main energization, a melt is prevented from jumping out from a space between the metal sheets, and thereby generation of expulsion at edge is prevented. In addition, the periphery of the electrode is first cooled, and thereby generation of surface flash is prevented. As a result, the optimum current range of spot welding can be expanded. Moreover, rapid cooling after the main energization is slowed down by the post energization. Alternatively, even if rapid cooling is performed after the main energization, ductility of the nugget section is increased through tempering after the rapid cooling, thereby strength of a spot weld joint can be further increased.

DESCRIPTION OF EMBODIMENTS

To solve the above-described problems, first, the inventors have made investigations on a mechanism of splash generation. Types of splash include "expulsion at edge" generated from a space between the stacked metal sheets, and "surface flash" generated from a surface of the metal sheet. When a stacked section of two or more stacked metal sheets is energized while being clamped from two sides of the stacked section by a pair of electrodes, and if a melted region becomes excessively large, a space (hereinafter, referred to as "plate space") between the metal sheets in the stacked section is expanded due to cubical expansion of the melted region. The expulsion at edge is generated by jumping out of part of a melt from the plate space to outside. The surface flash is generated by expansion of the melted region to a surface (on a side opposite to the joined side) of the metal sheet.

Hence, the inventors have considered that part of the melt is hindered from jumping out from the plate space by pressurizing the periphery of the melted region formed by energizing the stacked section while the stacked section is pressurized by the electrodes, and thereby generation of expulsion at edge can be prevented. The inventors have further considered that the periphery of each electrode is first cooled, thereby the melted region is hindered from expanding to the surface of the metal sheet in the periphery of the electrode, and thereby generation of surface flash can be prevented.

In addition, the inventors have considered a specific method to enable two different functions together, i.e., the function of hindering jumping-out of the melt from the plate space and the function of hindering expansion of the melted region to the surface of the metal sheet. In addition, the inventors have speculated that such an object can be achieved by providing a pressurizing member different from the electrodes in the immediate vicinity of the circumferential face of each electrode, and pressurizing the stacked section of the metal sheets in the periphery of the electrode by the pressurizing member when the stacked section is energized while being pressurized by the electrodes.

The inventors have therefore performed a verification test described in "Example 1" as mentioned later. As a result, the inventors have confirmed such a speculation and have made a further investigation, and finally have completed a first invention.

When the stacked section in the periphery of each electrode is pressurized by the pressurizing member, the melted region is hindered from expanding to the surface of the metal sheet in the periphery of the electrode due to a cooling effect by the periphery of the electrode, so that generation of surface flash can be prevented. On the other hand, since the electrodes themselves are also cooled by a water cooling structure, when energization is finished, the stacked section is excessively rapidly cooled due to a combined effect of the cooling effect by the water-cooled electrodes and the cooling effect by the pressurizing member in the periphery of each electrode, and thus the nugget section is excessively hardened, so that strength of the weld joint may not be sufficiently increased, showing a need for further improvement.

The inventors therefore have speculated that cooling rate is slowed by post energization after the main energization, or even if rapid cooling is performed after the main energization, ductility of the nugget section can be increased through tempering after the rapid cooling, so that strength of the weld joint can be further increased.

The inventors have therefore performed a verification test described in "Example 2" as mentioned later. As a result, the inventors have confirmed such a speculation and have made a further investigation, and finally have completed second and third inventions.

According to the first invention, there is provided a spot welding method of joining two or more stacked metal sheets together by applying a welding current to a stacked section of the metal sheets, the method using a spot welding machine including a pair of electrodes configured to be in contact with two sides of the stacked section to apply a current to the stacked section, and a pressurizing member configured to pressurize the stacked section in a region corresponding to 20% or more of an entire circumferential region of a tip of each of the electrodes at a distance of 5 mm or less from an outer perimeter of the tip of the electrode, wherein a continuous unpressurized region occupies 30% or less (including 0%) of the entire circumferential region of the tip of the electrode. The spot welding method according to the first invention is characterized in that the metal sheets are joined together by clamping the stacked section by the pair of electrodes at a load of 100 N or more, pressurizing the periphery of each of the electrodes by the pressurizing member at a load of 5 to 1000% of a load given by the pair of electrodes, and applying a welding current to the stacked section by the electrodes.

According to the second invention, there is provided a spot welding method of joining two or more stacked steel sheets together by applying a welding current to a stacked section of the steel sheets, the method using a spot welding machine including a pair of electrodes configured to be in contact with two sides of the stacked section to apply a current to the stacked section, and a pressurizing member configured to pressurize the stacked section in a region corresponding to 20% or more of an entire circumferential region of a tip of each of the electrodes at a distance of 5 mm or less from an outer perimeter of the tip of the electrode, wherein a continuous unpressurized region occupies 20% or less (including 0%) of the entire circumferential region of the tip of the electrode. The spot welding method according to the second invention is characterized by having an electrode periphery pressurizing step of clamping the stacked section by the pair of electrodes at a load of 100 N or more, and pressurizing the periphery of each of the electrodes by the pressurizing member at a load of 5 to 1000% of a load given by the pair of electrodes, a main energization step of energizing the stacked section for welding by the electrodes, an energization standby step of taking energization standby time satisfying Formula (1) immediately after the main energization step, and following the energization standby step, a post energization step of post-energizing the stacked section by the electrodes such that Formulas (2) and (3) are satisfied, $$0 \leq WT \leq 200 \tag{1}$$

$$0.20 \times WC \leq PC \leq 0.90 \times WC \tag{2}$$

$$10 \leq PT \leq 200 \tag{3}$$

where WC represents welding current (kA), WT represents energization standby time (ms), PC represents post energization current (kA), and PT represents post energization time (ms).

According to the third invention, there is provided a spot welding method characterized by having, immediately after the main energization step described in the first invention, an aftertreatment step of repeating a combination N (N is 2 to 5) times such that Formula (7) is satisfied, the combination being a combination of an energization standby step of taking energization standby time satisfying Formula (4), and following the energization standby step, a post energization step of post-energizing the stacked section by the electrodes such that Formulas (5) and (6) are satisfied, $$0 \leq WTi \leq 200 \tag{4}$$

$$0.20 \times WC \leq PCi \leq 0.90 \times WC \tag{5}$$

$$10 \leq PTi \leq 200 \tag{6}$$

$$TT = \Sigma(WTi + PTi) \leq 500 \tag{7}$$

where i represents integer of 1 to N, WC represents welding current (kA), WTi represents ith energization standby time (ms), PCi represents ith post energization current (kA), PTi represents ith post energization time (ms), and TT represents total aftertreatment time (ms).

Hereinafter, the invention will be described more in detail with reference to accompanying drawings.

First Embodiment

An embodiment according to the first invention is now described.

Figure 1:
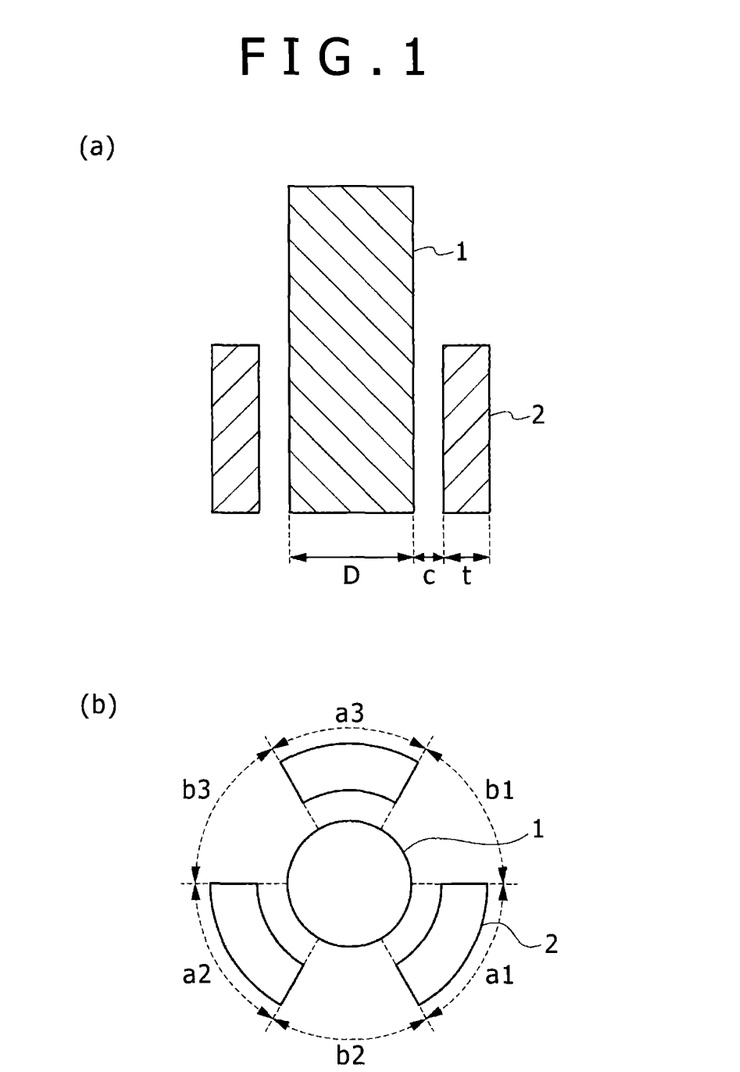
FIG. 1 includes diagrams each illustrating a schematic configuration of each of an electrode and a pressurizing member according to one embodiment of a spot welding machine used in the invention, where (a) is a longitudinal section diagram, and (b) is a plan diagram.

FIG. 1 illustrates a schematic configuration of each of an electrode and a pressurizing member according to one embodiment of a spot welding machine used in the first invention. A numeral 1 indicates the electrode. FIG. 1 exemplarily illustrates a flat-tip electrode with a cylindrical tip having a tip diameter D. A numeral 2 indicates the pressurizing member. FIG. 1 further exemplarily illustrates pressurizing members 2 as three columnar members that have sectorial sections with central angles a1, a2, and a3, respectively, and each have a thickness t. The three pressurizing members 2 are disposed, in a plan view, to enclose the circumference of the electrode 1 at a distance c from the outer perimeter of the tip of the electrode with spaces of central angles b1, b2, and b3 therebetween around a central axis of the electrode 1. In this exemplary case, the electrode 1 and the three pressurizing members 2 are each configured in upper and lower pairs, and each pair is disposed vertically symmetrically. In FIG. 1(a), therefore, disposition of only the upper half is illustrated while the lower half is omitted to be shown.

[Electrode]

The electrode 1 is configured in upper and lower pairs, and is designed to be in contact with two sides (upper and lower sides in this exemplary case) of a stacked section of two or more stacked metal sheets to apply a current to the stacked section. An electrode shape typically used in spot welding, such as a DR type and a flat-tip type, can be used as a shape of the electrode 1. An electrode material typically used in spot welding, such as pure copper, chromium copper, and alumina-dispersed copper, can be used as a material of the electrode 1. Although the two or more stacked metal sheets to be joined by the spot welding method according to the first invention are each typically a steel sheet, the metal sheets may each be an aluminum alloy sheet or may be a mixture of a steel sheet and an aluminum alloy sheet.

[Pressurizing Member]

The pressurizing member 2 is configured to pressurize the stacked section in a region (a1+a2+a3) corresponding to 20% or more of an entire circumferential region of the tip of the electrode 1 at a distance c of 5 mm or less from an outer perimeter of the tip of the electrode 1. The pressurizing member 2 is further configured such that a continuous unpressurized region (b1, b2, or b3) occupies 30% or less (including 0%) of the entire circumferential region of the tip of the electrode 1.

<Pressurizing Region at Distance c of 5 mm or Less from Outer Perimeter of Tip of Electrode 1>

It is necessary that the pressurizing member 2 is disposed as close as possible to the electrode 1 so that the immediate vicinity of the outer perimeter of the tip of the electrode 1 is cooled by the pressurizing member 2 during energization, thereby a melted region is hindered from expanding to the surface of the metal sheet, and thus generation of surface flash is prevented. The distance c is adjusted to 5 mm or less to effectively provide such an effect. Since a material of the pressurizing member 2 is required to have load-bearing strength at high temperature during energization, the material may include pure copper and chromium copper as with the electrode 1, and may include titanium, aluminum nitride, and silicon nitride. The pressurizing member 2 may be designed to be in contact with the outer perimeter of the tip of the electrode 1 (i.e., distance c=0 mm). In such a case, however, some approach is necessary to prevent a current from flowing to the metal sheet through the pressurizing member 2. For example, the pressurizing member 2 itself is made of an insulating material such as ceramics, or a surface of the pressurizing member 2 on a side to be in contact with the electrode 1 is covered with an insulating material.

<Pressurizing Regions (a1+a2+a3) Corresponding to 20% or More of Entire Circumferential Region of Tip of Electrode 1>

It is necessary to pressurize a region as wide as possible around the electrode to prevent generation of expulsion at edge through clamping the periphery of the electrode 1, and prevent generation of surface flash through cooling the periphery of the electrode 1. To this end, it is effective to divide a pressurizing region to provide a plurality of (three in this exemplary case) pressurizing members 2 as illustrated in FIG. 1. Furthermore, the total A (=a1+a2+a3) of the pressurizing regions is adjusted to 20% or more (72° or larger in central angle) of the entire circumferential region (360° in central angle) in order to effectively provide such an effect. It is obviously most preferable that the pressurizing region is adjusted to 100% of the entire circumferential region from the viewpoint of preventing generation of splash. In this case, the pressurizing member 2 is formed of one cylindrical member having a circular section and having no gap in a circumferential direction.

<Continuous Unpressurized Region B (=Largest One of b1, b2, and b3) Occupies 30% or Less (Including 0%) of Entire Circumferential Region of Tip of Electrode 1>

In the case where the pressurizing region is divided to provide a plurality of (three in this exemplary case) pressurizing members 2 as illustrated in FIG. 1, a continuous unpressurized region, i.e., the largest one of b1, b2, and b3, is designed to occupy 30% or less (108° or less in central angle) of the entire circumferential region. Consequently, it is possible to suppress expansion of a space between the stacked metal sheets, and thus hinder a melt from jumping out from the plate space.

<Thickness t of Pressurizing Member 2>

The thickness t of the pressurizing member 2 should be appropriately set within a range from 0.1 to 2.0 mm depending on a type of a material of the pressurizing member 2 or magnitude of a load to allow the pressurizing member 2 to withstand a load at high temperature during energization.

<Clamping Stacked Section by Pair of Electrodes 1 at Load of 100 N or More, and Pressurizing Periphery of Each Electrode by Pressurizing Member 2 at Load $F_E$ of 5 to 1000% of Load $F_c$ Given by Pair of Electrodes>

The load $F_c$ by the pair of electrodes 1 is adjusted to 100 N or more to ensure sufficient joint strength after spot welding. The load $F_E$ given by the pressurizing member 2 is adjusted to 5% or more of the load $F_c$ by the pair of electrodes 1 in order to prevent generation of expulsion at edge. Although a larger load $F_E$ by the pressurizing member 2 is more preferable from the viewpoint of preventing generation of expulsion at edge, the upper limit of the load $F_E$ is limited by capacity of a spot welder; hence, the upper limit is determined to be 1000% of the load $F_c$.

Second Embodiment

An embodiment according to the second invention is now described.

(Configuration of Spot Welding Machine)

A schematic configuration of each of an electrode and a pressurizing member according to one embodiment of a spot welding machine used in the second invention is as shown in FIG. 1 as in the first embodiment; hence, description thereof is omitted.

[Electrode]

As in the first embodiment, the electrode 1 is configured in upper and lower pairs, and is designed to be in contact with two sides (upper and lower sides in this exemplary case) of a stacked section of two or more stacked steel sheets to apply a current to the stacked section. An electrode shape typically used in spot welding, such as a DR type and a flat-tip type, can be used as a shape of the electrode 1. An electrode material typically used in spot welding, such as pure copper, chromium copper, and alumina-dispersed copper, can be used as a material of the electrode 1. The second embodiment covers only a case where the metal sheets to be welded are each a steel sheet. The two or more stacked steel sheets to be joined by the spot welding method according to the second invention may not be limited in steel type, and may be any type of steel sheet, such as a DP steel sheet, a TRIP steel sheet, and a hot-pressed steel sheet. The thickness of the steel sheet may also not be limited, but is recommended to be within a range from 0.3 to 3.0 mm suitable for spot welding. With the tensile strength of the steel sheet, a particularly large strength increasing effect is provided in the case of a high-strength steel sheet having a tensile strength in a range from 900 to 1850 MPa. A type of coating applied on a surface of the steel sheet includes any Zn-based coating without limitation, examples of which may include coatings of Zn, Zn—Fe, Zn—Ni, Zn—Al, and Sn—Zn. A coating method may be any of coating methods such as electroplating, hot-dip galvanizing, and hot-dip galvannealing. The two or more stacked steel sheets may not be limited to a combination of steel sheets of one type and one thickness, and may be any of combinations of steel sheets of one type and different thicknesses, different types and one thickness, and different types and different thicknesses.

[Pressurizing Member]

As in the first embodiment, the pressurizing member 2 is configured to pressurize the stacked section in a region (a1+a2+a3) corresponding to 20% or more of an entire circumferential region of a tip of the electrode 1 at a distance c of 5 mm or less from an outer perimeter of the tip of the electrode 1. On the other hand, somewhat unlike the first embodiment, the pressurizing member 2 is configured such that a continuous unpressurized region (b1, b2, or b3) occupies 20% or less (including 0%) of the entire circumferential region of the tip of the electrode 1.

<Pressuring Region at Distance c of 5 mm or Less from Outer Perimeter of Tip of Electrode 1>

As in the first embodiment, the pressurizing member 2 is disposed as close as possible to the electrode 1 so that the immediate vicinity of the outer perimeter of the tip of the electrode 1 is cooled by the pressurizing member 2 during energization, thereby a melted region is hindered from expanding to the surface of the metal sheet, and thus generation of surface flash is prevented. The distance c is adjusted to 5 mm or less to effectively provide such an effect. Since a material of the pressurizing member 2 is required to have load-bearing strength at high temperature during energization, the material may include pure copper and chromium copper as with the electrode 1, and may include titanium, aluminum nitride, and silicon nitride. The pressurizing member 2 may be designed to be in contact with the outer perimeter of the tip of the electrode 1 (i.e., distance c=0 mm). In such a case, some approach is necessary to prevent a current from flowing to the metal sheet through the pressurizing member 2. For example, the pressurizing member 2 itself is made of an insulating material such as ceramics, or a surface of the pressurizing member 2 on a side to be in contact with the electrode 1 is covered with an insulating material.

<Pressurizing Regions (a1+a2+a3) Corresponding to 20% or More of Entire Circumferential Region of Tip of Electrode 1>

As in the first embodiment, it is necessary to pressurize a region as wide as possible around the electrode to prevent generation of expulsion at edge through clamping the periphery of the electrode 1, and prevent generation of surface flash through cooling the periphery of the electrode 1. As in the first embodiment, a pressurizing region may be divided to provide a plurality of (three in this exemplary case) pressurizing members 2 as illustrated in FIG. 1. The total A (=a1+a2+a3) of pressurizing regions is adjusted to 20% or more (72° or larger in central angle) of the entire circumferential region (360° in central angle) in order to effectively provide such an effect. It is obviously most preferable that the pressurizing region is adjusted to 100% of the entire circumference from the viewpoint of preventing generation of splash. In this case, the pressurizing member 2 is formed of one cylindrical member having a circular section and having no gap in a circumferential direction.

<Continuous Unpressurized Region B (=Largest One of b1, b2, and b3) Occupies 20% or Less (Including 0%) of Entire Circumferential Region of Tip of Electrode 1>

In the case where the pressurizing region is divided to provide a plurality of (three in this exemplary case) pressurizing members 2 as illustrated in FIG. 1, a continuous unpressurized region, i.e., the largest one of b1, b2, and b3, is designed to occupy 20% or less (72° or less in central angle) of the entire circumferential region. Consequently, it is possible to suppress expansion of a space between the stacked metal sheets, and thus hinder a melt from jumping out from the plate space.

<Thickness t of Pressurizing Member 2>

As in the first embodiment, the thickness t of the pressurizing member 2 should be appropriately set within a range from 0.1 to 2.0 mm depending on a type of a material of the pressurizing member 2 or magnitude of a load to allow the pressurizing member 2 to withstand a load at high temperature during energization.

(Spot Welding Condition)

[Electrode Periphery Pressurizing Step]

As in the first embodiment, the stacked section is clamped by a pair of electrodes 1 at a load $F_c$ of 100 N or more, and the periphery of each electrode 1 is pressurized by the pressurizing member 2 at a load $F_E$ of 5 to 1000% of the load $F_c$ given by the pair of electrodes.

The load $F_c$ by the pair of electrodes 1 is adjusted to 100 N or more to ensure sufficient joint strength after spot welding. The load $F_E$ given by the pressurizing member 2 is adjusted to 5% or more of the load $F_c$ by the pair of electrodes 1 in order to prevent generation of expulsion at edge. Although a larger load $F_E$ by the pressurizing member 2 is more preferable from the viewpoint of preventing generation of expulsion at edge, the upper limit of the load $F_E$ is limited by capacity of a spot welder; hence, the upper limit is determined to be 1000% of the load $F_c$.

[Main Energization Step]

After that, unlike the first embodiment, the stacked section is energized for welding by the electrodes. Welding current WC (kW) and main energization time (ms) should each be appropriately set such that a nugget diameter can be secured within a range, in which no splash is generated, depending on material and/or thickness of each steel sheet to be joined.

[Energization Standby Step]

Energization standby time WT (ms) satisfying Formula (1) is taken immediately after the main energization step.

$$0 \leq WT \leq 200 \tag{1}$$

WT=0 means that post energization is performed after the main energization has been finished without taking the energization standby time. Since rapid cooling can be slowed down even if the energization standby time is short or is not taken, the lower limit of the energization standby time WT is determined to be 0 ms. However, since excessively long time for spot welding for each point leads to reduction in productivity of the entire welding operation, the upper limit of the energization standby time WT is determined to be 200 ms.

[Post Energization Step]

Following the energization standby step, the stacked section is post-energized by the electrodes such that Formulas (2) and (3) are satisfied, so that strength of a spot weld joint is increased, $$0.20 \times WC \leq PC \leq 0.90 \times WC \tag{2}$$

$$10 \leq PT \leq 200 \tag{3}$$

where PC represents post energization current (kA), and PT represents post energization time.

An excessively low post energization current results in insufficient heating, and thus the rapid-cooling slowing-down effect and the tempering effect are not sufficiently exhibited. On the other hand, an excessively high post energization current results in remelting or reverse transformation of a nugget section, and thus the nugget section becomes fragile through the following second-time rapid cooling. In other words, each of excessively high and low post energization currents prevents the effect of post energization from being exhibited. Consequently, the post energization current PC is determined to be within a range from 20 to 90% of the welding current WC.

Excessively short post energization time results in insufficient heating, and thus the rapid-cooling slowing-down effect and the tempering effect are not sufficiently exhibited. On the other hand, excessively long post energization time results in remelting or reverse transformation of a nugget section, and thus the nugget section becomes fragile through the following second-time rapid cooling. In other words, each of the excessively short post energization time and the excessively long post energization time prevents the effect of post energization from being exhibited. Consequently, the post energization time PT is determined to be within a range from 10 to 200 ms.

Third Embodiment

An embodiment according to the third invention is now described.

Although the second embodiment has been exemplified with a case where one-time post energization is performed, the third embodiment is exemplified with a case where post energization is performed in several steps. The configuration of the spot welding machine and steps up to the main energization step in the third embodiment are common to those in the second embodiment; hence, duplicated description is omitted. Description is now made only on the aftertreatment step (step of repeating "energization step and post energization step" several times).

[Aftertreatment Step]

The aftertreatment step is performed when the main energization step has been finished. The aftertreatment step is a combination of an energization standby step of taking energization standby time satisfying Formula (4), and a subsequent post energization step of post-energizing the stacked section by the electrodes such that Formulas (5) and (6) are satisfied. The aftertreatment step is repeated N (N is 2 to 5) times such that Formula (7) is satisfied. Consequently, strength of a spot weld joint is increased.

$$0 \leq WTi \leq 200 \quad (4)$$

$$0.20 \times WC \leq PCi \leq 0.90 \times WC \quad (5)$$

$$10 \leq PTi \leq 200 \quad (6)$$

$$TT = \Sigma(WTi + PTi) \leq 500 \quad (7)$$

In the Formulas, i represents integer of 1 to N, WC represents welding current (kA), WTi represents ith energization standby time (ms), PCi represents ith post energization current (kA), PTi represents ith post energization current time, and TT represents total aftertreatment time.

The post energization is thus repeatedly performed in several steps, thereby cooling rate can be more finely controlled, and the quenching/tempering effect is more securely provided, and consequently strength of the spot weld joint can be further increased. However, an excessively large number of times N of repetition results in excessively long time for a single run of spot welding, leading to reduction in productivity of the entire welding operation. Hence, the upper limit of the number of times N of repetition is determined to be five. Moreover, if time of the aftertreatment after the main energization is excessively long, spot welding time is also excessively long, leading to reduction in productivity of the entire welding operation. Hence, the upper limit of the total aftertreatment time TT is determined to be 500 ms.

The reasons for numerical limitation in the Formulas (4), (5), and (6) are the same as those for numerical limitation in the Formulas (1), (2), and (3), respectively, in the second embodiment.

Figure 2:
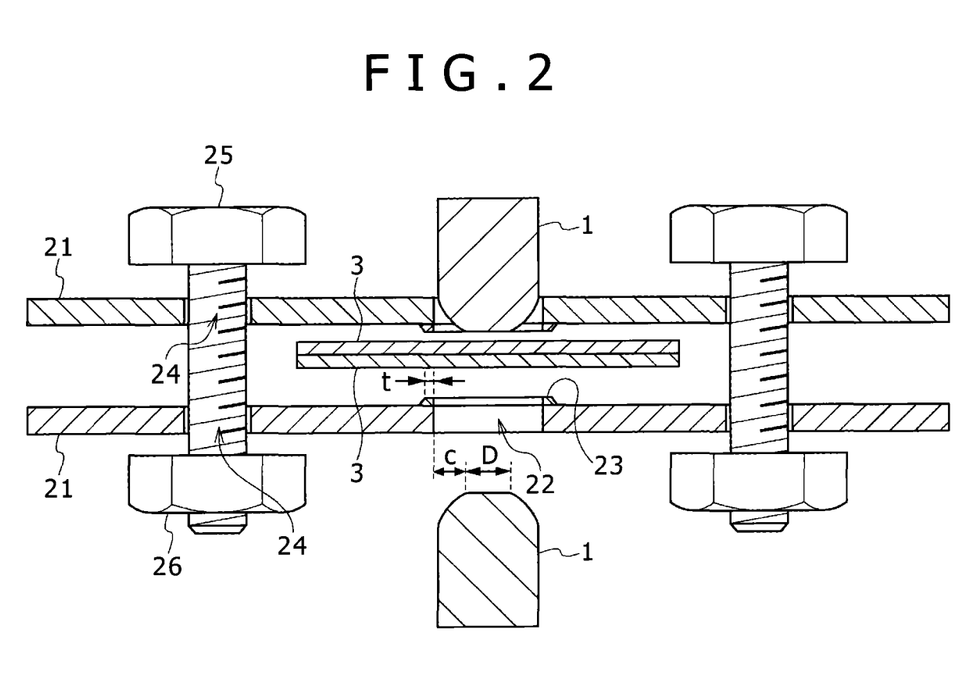
FIG. 2 is a partial longitudinal section diagram illustrating a schematic configuration of a test apparatus used in Examples 1 and 2.
Figure 3:
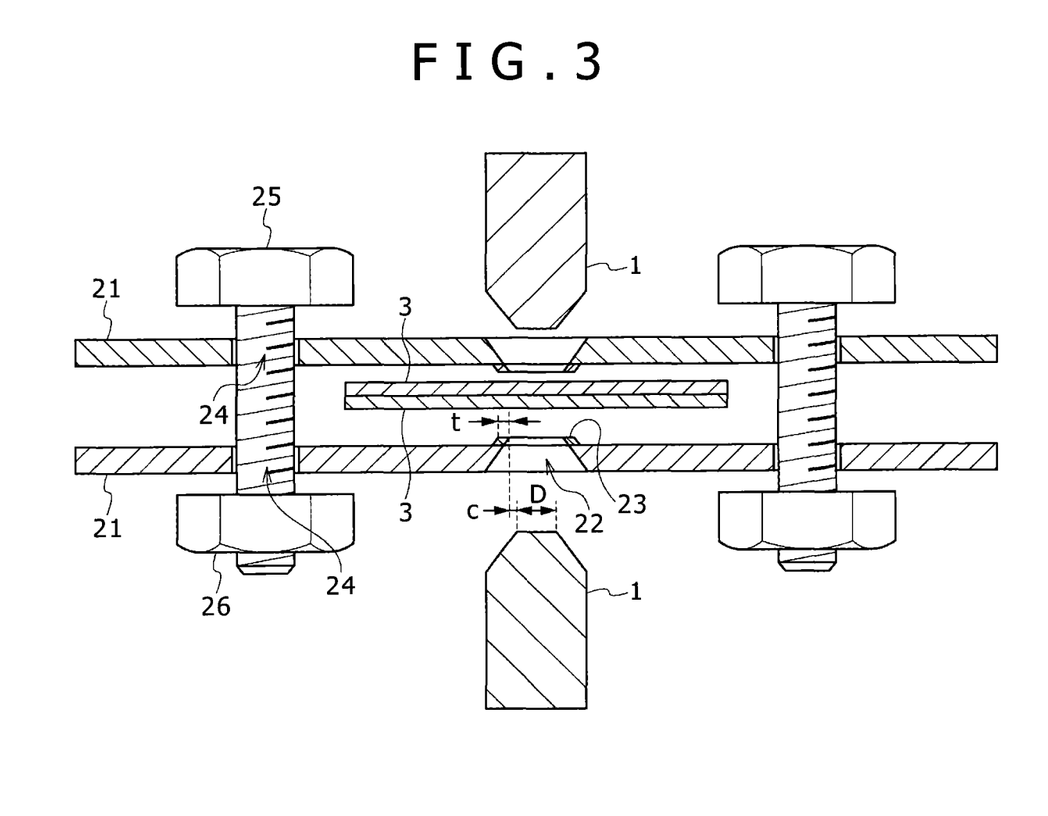
FIG. 3 is a partial longitudinal section diagram illustrating a schematic configuration of a test apparatus used in Example 2.
Figure 4:
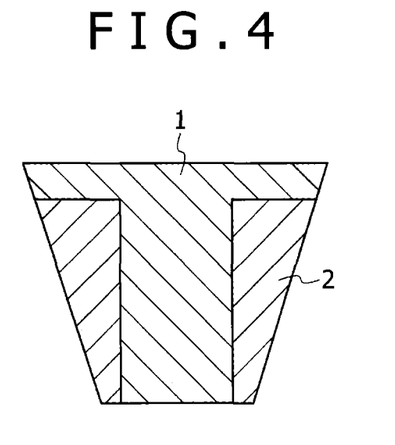
FIG. 4 is a longitudinal section diagram illustrating a schematic configuration of a pressurizing member according to another embodiment of the spot welding machine used in the invention.

Common to the first to third inventions, the electrode 1 and the pressurizing member 2 may be separately formed as illustrated in FIG. 1 used for description of the first to third embodiments, or as illustrated in FIGS. 2 and 3 used in Examples 1 and 2 described later, but may be formed in an integrated shape as exemplarily illustrated in FIG. 4. The electrode 1 and the pressurizing member 2 configured in such a way can also exhibit the effects of the invention.

EXAMPLE 1

The following simulation was performed using a spot welder to prove the applicability of the spot welding method according to the first invention.

FIG. 2 illustrates an outline of an experimental apparatus. Two stacked steel sheets of 980 MPa class 1 mm in thickness were used as metal sheets 3 and 3 to be joined. An electrode used in a reference example (Test No. 1) described later, of which the shape is a DR type (tip radius diameter D=7 mm) and the material is chromium copper, is exemplified as the electrode 1. Two thick steel sheets 21 and 21 were used as the pressurizing member 2 to simulate a load adjusting function. Specifically, first, an electrode passing hole 22, through which the electrode 1 passed, was provided at the center of each of the two thick steel sheets 21 and 21. Around the electrode passing hole 22, a projection 23 having a thickness t, which was shaped in a circle or a plurality of fans in a plan view, was provided by welding so as to be opposed to another projection 23 at a position at a distance c from the outer perimeter of the tip radius of the electrode 1. Furthermore, bolt holes 24 were provided in each of the two thick steel sheets 21 and 21 at positions in four directions away from the electrode passing hole 22, and a bolt 25 was threaded through the opposed bolt holes 24 and 24 of the steel sheets 21 and 21, and the thick steel sheets 21 and 21 were fastened with nuts 26.

The load $F_c$ given by the electrode 1 was set using the pressure adjustment function of the spot welder. The load $F_E$ given by the pressurizing member 2 was set through adjusting fastening power of the bolt 25 and the nut 26 while the fastening power was measured by a torque meter.

The shape and a material of the electrode 1, a material of the pressurizing member 2 (projection), the distance c from the electrode 1, the range (central angle) A of the pressurizing region, the largest range (central angle) B of the continuous unpressurized region, the load $F_c$ by the electrode 1, and the load $F_E$ by the pressurizing member 2 were each varied. Spot welding was performed under each condition while a welding current was gradually increased from a relatively low current, so that a demarcation current, at which splash generation was started, was determined. A splash type was specified through observation of a section of a joint produced as a result of the test in which the splash was generated.

Table 1 shows test conditions and measurement results.

TABLE 1

| Test No. | Electrode shape | Electrode material | Material for pressurizing member | Electrode tip diameter D (mm) | Distance from outer circumference of electrode tip to pressurizing member C (mm) | Thickness of pressurizing member t (mm) | Total area of regions pressurized by pressurizing member A (Degree) | A/360 × 100 (%) |
|---|---|---|---|---|---|---|---|---|
| 1 | DR type | Chromium copper | — | 7 | — | — | — | — |
| 2 | DR type | Chromium copper | Steel | 7 | 3.5 | 1 | 360 | 100 |
| 3 | DR type | Chromium copper | Steel | 7 | 3.5 | 1 | 180 | 50 |
| 4 | DR type | Chromium copper | Steel | 7 | 3.5 | 1 | 360 | 100 |
| 5 | DR type | Chromium copper | Steel | 7 | 3.5 | 1 | 360 | 100 |
| 6 | DR type | Chromium copper | Steel | 7 | 10* | 1 | 360 | 100 |
| 7 | DR type | Chromium copper | Steel | 7 | 3.5 | 1 | 60* | 17* |
| 8 | Flat-tip type | Chromium copper | Steel | 7 | 0 | 1 | 360 | 100 |
| 9 | DR type | Pure copper | Pure copper | 7 | 3.5 | 1 | 360 | 100 |
| 10 | DR type | Chromium copper | Chromium copper | 7 | 3.5 | 1 | 360 | 100 |
| 11 | DR type | Chromium copper | Aluminum nitride | 7 | 3.5 | 1 | 360 | 100 |
| 12 | DR type | Chromium copper | Silicon nitride | 7 | 3.5 | 1 | 360 | 100 |
| 13 | DR type | Alumina-dispersed copper | Titanium | 7 | 3.5 | 1 | 360 | 100 |
| 14 | DR type | Alumina-dispersed copper | Steel | 7 | 3.5 | 1 | 360 | 100 |
| 15 | DR type | Chromium copper | Steel | 7 | 3.5 | 1 | 360 | 100 |
| 16 | DR type | Chromium copper | Steel | 7 | 3.5 | 1 | 360 | 100 |

| Test No. | Largest continuous region being not pressurized by pressurizing member B (Degree) | B/360 × 100 (%) | Load by electrode $F_C$ (N) | Load by pressurizing member $F_E$ (N) | $F_E/F_C$ (%) | Splash-generation demarcation current (kA) | Splash type | Remarks |
|---|---|---|---|---|---|---|---|---|
| 1 | — | — | 3000 | — | — | 6.5 | Expulsion at edge | Reference example |
| 2 | 0 | 0 | 2500 | 500 | 20 | 9.5 | Surface flash | Inventive example |
| 3 | 45 | 13 | 2500 | 500 | 20 | 8.5 | Expulsion at edge | Inventive example |
| 4 | 0 | 0 | 1000 | 2000 | 200 | 8.5 | Surface flash | Inventive example |
| 5 | 0 | 0 | 50 | 2950 | 5900* | 6.5 | Surface flash | Comparative example |
| 6 | 0 | 0 | 2500 | 500 | 20 | 7 | Surface flash | Comparative example |
| 7 | 25 | 7 | 2500 | 500 | 20 | 7 | Expulsion at edge | Comparative example |
| 8 | 0 | 0 | 2500 | 500 | 20 | 9.5 | Surface flash | Inventive example |
| 9 | 0 | 0 | 2500 | 500 | 20 | 9.5 | Surface flash | Inventive example |
| 10 | 0 | 0 | 2500 | 500 | 20 | 9.5 | Surface flash | Inventive example |
| 11 | 0 | 0 | 2500 | 500 | 20 | 9.5 | Surface flash | Inventive example |
| 12 | 0 | 0 | 2500 | 500 | 20 | 9.5 | Surface flash | Inventive example |
| 13 | 0 | 0 | 2500 | 500 | 20 | 9.5 | Surface flash | Inventive example |
| 14 | 0 | 0 | 2800 | 200 | 7 | 8.5 | Surface flash | Inventive example |
| 15 | 0 | 0 | 3500 | 1500 | 43 | 8.5 | Surface flash | Inventive example |
| 16 | 0 | 0 | 1300 | 700 | 54 | 8.5 | Surface flash | Inventive example |

(*Out of range of the invention)

In table 1, Test No. 1 is a reference example corresponding to traditional spot welding without providing the pressurizing member. The splash demarcation current of this reference example is 6.5 kA.

Test Nos. 2 to 4 and 8 to 16 are each an inventive example that satisfies all the requirements of the invention. In any of the inventive examples, the splash demarcation current is 8.5 kA or more, showing that the splash demarcation current is extremely larger than that of the reference example.

In contrast, Test Nos. 5 to 7 are each a comparative example that does not satisfy at least one of the requirements of the invention. The splash demarcation current of each of the comparative examples is 6.5 to 7 kA that is substantially similar to the splash demarcation current of the reference example. It is therefore understood that each of the comparative examples shows almost no improvement effect.

As clearly seen from the above results, it is possible to easily and securely prevent splash generation without need of complicated control by using the spot welding method according to the first invention. Specifically, the above results reveal that the splash demarcation current is extremely increased, and thus the optimum current range of spot welding can be expanded.

EXAMPLE 2

The following simulation was performed using a spot welder to prove the applicability of the spot welding method according to each of the second and third inventions.

FIG. 3 illustrates an outline of an experimental apparatus. Two stacked steel hot-pressed sheets of 1470 MPa class 1.2 mm in thickness were used as metal sheets 3 and 3 to be joined. An electrode used under standard conditions 1 and 2 (Test Nos. 101 and 129) described later, of which the shape is a CR type (tip radius diameter D=7 mm) and the material is chromium copper, is exemplified as the electrode 1. Two thick steel sheets 21 and 21 were used as the pressurizing member 2 to simulate a load adjusting function. Specifically, first, an electrode passing hole 22 having a truncated cone shape, through which the tip radius of the electrode 1 passed, was provided at the center of each of the two thick steel sheets 21 and 21. Around the electrode passing hole 22, a projection 23 having a thickness t, which was shaped in a circle or a plurality of fans in a plan view, was provided by welding so as to be opposed to another projection 23 at a position at a distance c from the outer perimeter of the tip radius of the electrode 1. Furthermore, bolt holes 24 were provided in each of the two thick steel sheets 21 and 21 at positions in four directions away from the electrode passing hole 22, and a bolt 25 was threaded through the opposed bolt holes 24 and 24 of the steel sheets 21 and 21, and the thick steel sheets 21 and 21 were fastened with nuts 26.

In this simulation, while the two stacked steel hot-pressed sheets of 1470 MPa class 1.2 mm in thickness were used as the metal sheets 3 and 3 to be joined in the same way as described above, an electrode shaped in a DR type (tip radius diameter D=7 mm) as illustrated in FIG. 2 was further used as the electrode 1. Chromium copper was used as a material of the electrode 1. The pressurizing member 2 was configured in the same way as described above (except that the electrode passing hole 22 was formed into a cylindrical shape).

The experimental apparatus illustrated in FIG. 2 or 3 was used. The load $F_c$ given by the electrode 1 was set using a pressure adjustment function of the spot welder. The load $F_E$ given by the pressurizing member 2 was set through adjusting fastening power of the bolt 25 and the nut 26 while the fastening power was measured by a torque meter.

The shape and a material of the electrode 1, a material of the pressurizing member 2 (projection), the distance c from the electrode 1, the range (central angle) A of the pressurizing region, the largest range (central angle) B of the continuous unpressurized region, the load $F_c$ by the electrode 1, and the load $F_E$ by the pressurizing member 2 were each varied. Spot welding was performed under each condition while a welding current was gradually increased from a relatively low current, so that a demarcation current (which may be hereinafter referred to as "splash demarcation current"), at which splash generation was started, was determined.

Subsequently, weld joints were produced under the above-described conditions while the welding current WC, the energization standby time WT, the post energization current PC (or PCi), the post energization time PT (or PTi), the number of times N of repetition of "energization standby and post energization" were each varied. A shear tensile test was performed according to JIS Z3136 to determine joint strength in shear. In all Tests, the main energization time was fixed to 60 ms.

Although the welding current WC was set within a range of a current equal to or lower than the splash demarcation current in each Test except for Test No. 103, a welding current higher than the splash demarcation current was intentionally used in Test No. 103. As a result, splash was generated in Test No. 103, and a type of the splash was specified through observation of a section of a resultant weld joint.

Tables 2 to 4 show test conditions, and Table 5 shows measurement results.

TABLE 2

| | | | | | | | Configuration of spot welder | | | |
|---|---|---|---|---|---|---|---|---|---|---|
| | | | | | | | | Total area of regions pressurized by pressurizing member | | Largest continuous region being not pressurized by pressurizing member | |
| | | | | Electrode | Distance from outer circumference of electrode tip | Thickness of | | | | |
| Test No. | Electrode shape | Electrode material | Material for pressurizing member | tip diameter D (mm) | to pressurizing member C (mm) | pressurizing member t (mm) | A (Degree) | A/360 × 100 (%) | B (Degree) | A/360 × 100 (%) |
| 101 | CR type | Chromium copper | — | 7 | — | — | — | — | — | — |
| 102 | CR type | Chromium copper | —* | 7 | —* | —* | —* | —* | —* | —* |
| 103 | CR type | Chromium copper | —* | 7 | —* | —* | —* | —* | —* | —* |
| 104 | CR type | Chromium copper | Steel | 7 | 0.5 | 1 | 360 | 100 | 0 | 0 |
| 105 | CR type | Chromium copper | Steel | 7 | 0.5 | 1 | 360 | 100 | 0 | 0 |

TABLE 2-continued

| Test No. | Electrode shape | Electrode material | Material for pressurizing-member | Electrode tip diameter D (mm) | Thickness of pressurizing member t (mm) | Distance from outer circumference of electrode tip to pressurizing member C (mm) | A (Degree) | A/360 × 100 (%) | B (Degree) | A/360 × 100 (%) |
|---|---|---|---|---|---|---|---|---|---|---|
| 106 | CR type | Chromium copper | Steel | 7 | 0.5 | 1 | 360 | 100 | 0 | 0 |
| 107 | CR type | Chromium copper | Steel | 7 | 0.5 | 1 | 360 | 100 | 0 | 0 |
| 108 | CR type | Chromium copper | Steel | 7 | 0.5 | 1 | 360 | 100 | 0 | 0 |
| 109 | CR type | Chromium copper | Steel | 7 | 0.5 | 1 | 360 | 100 | 0 | 0 |
| 110 | CR type | Chromium copper | Steel | 7 | 0.5 | 1 | 360 | 100 | 0 | 0 |
| 111 | CR type | Chromium copper | Steel | 7 | 0.5 | 1 | 360 | 100 | 0 | 0 |
| 112 | CR type | Chromium copper | Steel | 7 | 0.5 | 1 | 360 | 100 | 0 | 0 |
| 113 | CR type | Chromium copper | Steel | 7 | 0.5 | 1 | 360 | 100 | 0 | 0 |
| 114 | CR type | Chromium copper | Steel | 7 | 3.5 | 1 | 360 | 100 | 0 | 0 |
| 115 | CR type | Chromium copper | Steel | 7 | 10* | 1 | 360 | 100 | 0 | 0 |
| 116 | CR type | Chromium copper | Steel | 7 | 0.5 | 1 | 90 | 25 | 18 | 10 |
| 117 | CR type | Chromium copper | Steel | 7 | 0.5 | 1 | 36* | 10* | 18 | 10 |
| 118 | CR type | Chromium copper | Steel | 7 | 0.5 | 1 | 90 | 25 | 90* | 25* |
| 119 | CR type | Chromium copper | Pure copper | 7 | 0.5 | 1 | 360 | 100 | 0 | 0 |
| 120 | CR type | Chromium copper | Chromium copper | 7 | 0.5 | 1 | 360 | 100 | 0 | 0 |
| 121 | CR type | Chromium copper | Aluminum nitride | 7 | 0.5 | 1 | 360 | 100 | 0 | 0 |
| 122 | CR type | Chromium copper | Silicon nitride | 7 | 0.5 | 1 | 360 | 100 | 0 | 0 |
| 123 | CR type | Alumina-dispersed copper | Titanium | 7 | 0.5 | 1 | 360 | 100 | 0 | 0 |
| 124 | CR type | Alumina-dispersed copper | Steel | 7 | 0.5 | 1 | 360 | 100 | 0 | 0 |

| | Spot welding condition | | | | | | |
|---|---|---|---|---|---|---|---|
| Test No. | Load by electrode $F_C$ (N) | Load by pressurizing member $F_E$ (N) | $F_E/F_C$ (%) | Welding current WC (kA) | Energization standby time WT (ms) | Post energization current PC (kA) | PC/WC (—) | Post energization time PT (ms) |
| 101 | 3000 | — | — | 6.5 | — | — | — | — |
| 102 | 3000 | —* | —* | 6.5 | 30 | 3.5 | 0.54 | 30 |
| 103 | 3000 | —* | —* | 9.0 | 30 | 4.5 | 0.50 | 30 |
| 104 | 2000 | 1000 | 50 | 9.0 | —* | —* | —* | —* |
| 105 | 2000 | 1000 | 50 | 9.0 | 0 | 4.5 | 0.50 | 30 |
| 106 | 2000 | 1000 | 50 | 9.0 | 30 | 4.5 | 0.50 | 30 |
| 107 | 2000 | 1000 | 50 | 9.0 | 150 | 4.5 | 0.50 | 30 |
| 108 | 2000 | 1000 | 50 | 9.0 | 30 | 7.0 | 0.78 | 30 |
| 109 | 2000 | 1000 | 50 | 9.0 | 30 | 9.0 | 1.00* | 30 |
| 110 | 2000 | 1000 | 50 | 9.0 | 30 | 4.5 | 0.50 | 500* |
| 111 | 2000 | 1000 | 50 | 9.0 | 150 | 4.5 | 0.50 | 30 |
| 112 | 1000 | 2000 | 200 | 8.5 | 30 | 4.3 | 0.51 | 30 |
| 113 | 50 | 2950 | 5900* | 7.0 | 30 | 3.5 | 0.50 | 30 |
| 114 | 2000 | 1000 | 50 | 8.5 | 30 | 4.3 | 0.51 | 30 |
| 115 | 2000 | 1000 | 50 | 7.0 | 30 | 3.5 | 0.50 | 30 |
| 116 | 2000 | 1000 | 50 | 8.5 | 30 | 4.3 | 0.51 | 30 |
| 117 | 2000 | 1000 | 50 | 6.5 | 30 | 3.3 | 0.51 | 30 |
| 118 | 2000 | 1000 | 50 | 6.5 | 30 | 3.3 | 0.51 | 30 |
| 119 | 2000 | 1000 | 50 | 9.0 | 30 | 4.5 | 0.50 | 30 |
| 120 | 2000 | 1000 | 50 | 9.0 | 30 | 4.5 | 0.50 | 30 |
| 121 | 2000 | 1000 | 50 | 9.0 | 30 | 4.5 | 0.50 | 30 |
| 122 | 2000 | 1000 | 50 | 9.0 | 30 | 4.5 | 0.50 | 30 |
| 123 | 2000 | 1000 | 50 | 9.0 | 30 | 4.5 | 0.50 | 30 |
| 124 | 2800 | 200 | 7 | 9.0 | 30 | 4.5 | 0.50 | 30 |

(*Out of range of the invention, —: Not applicable)

TABLE 3

| Test No. | Electrode shape | Electrode material | Material for pressurizing-member | Electrode tip diameter D (mm) | Thickness of pressurizing member t (mm) | Distance from outer circumference of electrode tip to pressurizing member C (mm) | Total area of regions pressurized by pressurizing member | | Largest continuous region being not pressurized by pressurizing member | |
|---|---|---|---|---|---|---|---|---|---|---|
| | | | | | | | A (Degree) | A/360 × 100 (%) | B (Degree) | A/360 × 100 (%) |
| 125 | CR type | Chromium copper | Steel | 7 | 0.5 | 1 | 360 | 100 | 0 | 0 |

TABLE 3-continued

| Test No. | Electrode shape | Electrode material | Material for pressurizing member | Electrode tip diameter D (mm) | Distance from outer circumference of electrode tip to pressurizing member C (mm) | Thickness of pressurizing member t (mm) | Total area of regions pressurized by pressurizing member A (Degree) | A/360 × 100 (%) | Largest continuous region being not pressurized by pressurizing member B (Degree) | A/360 × 100 (%) |
|---|---|---|---|---|---|---|---|---|---|---|
| 126 | CR type | Chromium copper | Steel | 7 | 0.5 | 1 | 360 | 100 | 0 | 0 |
| 127 | CR type | Chromium copper | Steel | 7 | 0.5 | 1 | 360 | 100 | 0 | 0 |
| 128 | CR type | Chromium copper | Steel | 7 | 0.5 | 1 | 360 | 100 | 0 | 0 |

| | Spot welding condition | | | | | | | | | |
|---|---|---|---|---|---|---|---|---|---|---|
| Test No. | Load by electrode $F_C$ (N) | Load by pressurizing member $F_E$ (N) | $F_E/F_C$ (%) | Welding current WC (kA) | Repetition number N (Times) | i (ith time) | Energization standby time $WT_i$ (ms) | Post energization current $PC_i$ (kA) | $PC_i/WC$ (—) | Post energization time $PT_i$ (ms) | Total after-treatment time TT (ms) |
| 125 | 3000 | 1000 | 33 | 9.0 | 2 | 1 | 30 | 4.5 | 0.50 | 30 | 120 |
| | | | | | | 2 | 30 | 4.5 | 0.50 | 30 | |
| 126 | 3000 | 1000 | 33 | 9.0 | 3 | 1 | 30 | 4.5 | 0.50 | 30 | 150 |
| | | | | | | 2 | 20 | 4.5 | 0.50 | 30 | |
| | | | | | | 3 | 10 | 4.5 | 0.50 | 30 | |
| 127 | 3000 | 1000 | 33 | 9.0 | 4 | 1 | 20 | 4.5 | 0.50 | 30 | 160 |
| | | | | | | 2 | 20 | 4.5 | 0.50 | 30 | |
| | | | | | | 3 | 0 | 3.0 | 0.33 | 30 | |
| | | | | | | 4 | 0 | 3.0 | 0.33 | 30 | |
| 128 | 3000 | 1000 | 33 | 9.0 | 5 | 1 | 0 | 6.0 | 0.67 | 30 | 170 |
| | | | | | | 2 | 0 | 3.0 | 0.33 | 30 | |
| | | | | | | 3 | 20 | 5.0 | 0.56 | 30 | |
| | | | | | | 4 | 0 | 3.0 | 0.33 | 30 | |
| | | | | | | 5 | 0 | 5.0 | 0.56 | 30 | |

(*Out of range of the invention, —: Not applicable)

TABLE 4

| Test No. | Electrode shape | Electrode material | Material for pressurizing member | Electrode tip diameter D (mm) | Distance from outer circumference of electrode tip to pressurizing member C (mm) | Thickness of pressurizing member t (mm) | Total area of regions pressurized by pressurizing member A (Degree) | A/360 × 100 (%) | Largest continuous region being not pressurized by pressurizing member B (Degree) | A/360 × 100 (%) |
|---|---|---|---|---|---|---|---|---|---|---|
| 129 | CR type | Chromium copper | — | 7 | — | — | — | — | — | — |
| 130 | CR type | Chromium copper | Steel | 7 | 0.5 | 1 | 360 | 100 | 0 | 0 |

| | Spot welding condition | | | | | | | |
|---|---|---|---|---|---|---|---|---|
| Test No. | Load by electrode $F_C$ (N) | Load by pressurizing member $F_E$ (N) | $F_E/F_C$ (%) | Welding current WC (kA) | Energization standby time WT (ms) | Post energization current PC (kA) | PC/WC (—) | Post energization time PT (ms) |
| 129 | 4000 | — | — | 8.0 | — | — | — | — |
| 130 | 3000 | 1000 | 33 | 11.0 | 30 | 5.5 | 0.50 | 30 |

(*Out of range of the invention, —: Not applicable)

TABLE 5

| Test No. | Splash-generation demarcation current (kA) | Splash generation state | Joint strength in shear Absolute value (kN) | Increasing rate with respect to standard condition (%) | Evaluation Increasing rate ⊚: 40% or more ○: 30% or more X: Less than 30% | Remarks |
|---|---|---|---|---|---|---|
| 101 | 6.5 | not generated | 16.4 | — | — | Standard condition 1 |
| 102 | 6.5 | not generated | 18.9 | 15.2* | X | Comparative example |
| 103 | 6.5 | expulsion at edge | 17.8 | 8.5* | X | Comparative example |
| 104 | 9.5 | not generated | 20.6 | 25.6* | X | Comparative example |
| 105 | 9.5 | not generated | 22.4 | 36.6 | ○ | Inventive example |
| 106 | 9.5 | not generated | 23.5 | 43.3 | ⊚ | Inventive example |
| 107 | 9.5 | not generated | 24.2 | 47.6 | ⊚ | Inventive example |
| 108 | 9.5 | not generated | 24.5 | 49.4 | ⊚ | Inventive example |
| 109 | 9.5 | not generated | 20.1 | 22.6* | X | Comparative example |
| 110 | 9.5 | not generated | 20.7 | 26.2* | X | Comparative example |
| 111 | 9.5 | not generated | 24.2 | 47.6 | ⊚ | Inventive example |
| 112 | 9.0 | not generated | 23.1 | 40.9 | ⊚ | Inventive example |
| 113 | 7.0 | not generated | 19.4 | 18.3* | X | Comparative example |
| 114 | 8.5 | not generated | 22.1 | 34.8 | ○ | Inventive example |
| 115 | 7.0 | not generated | 18.4 | 12.2* | X | Comparative example |
| 116 | 8.5 | not generated | 21.9 | 33.5 | ○ | Inventive example |
| 117 | 6.5 | not generated | 17.3 | 5.5* | X | Comparative example |
| 118 | 6.5 | not generated | 16.6 | 1.2* | X | Comparative example |
| 119 | 9.5 | not generated | 22.5 | 37.2 | ○ | Inventive example |
| 120 | 9.5 | not generated | 23.1 | 40.9 | ⊚ | Inventive example |
| 121 | 9.5 | not generated | 24.1 | 47.0 | ⊚ | Inventive example |
| 122 | 9.5 | not generated | 23.1 | 40.9 | ⊚ | Inventive example |
| 123 | 9.5 | not generated | 23.5 | 43.3 | ⊚ | Inventive example |
| 124 | 9.5 | not generated | 24.2 | 47.6 | ⊚ | Inventive example |
| 125 | 9.5 | not generated | 25.4 | 35.8 | ○ | Inventive example |
| 126 | 9.5 | not generated | 24.7 | 32.1 | ○ | Inventive example |
| 127 | 9.5 | not generated | 25.3 | 35.3 | ○ | Inventive example |
| 128 | 9.5 | not generated | 25.2 | 34.8 | ○ | Inventive example |
| 129 | 8.0 | not generated | 18.7 | — | — | Standard condition 2 |
| 130 | 11.0 | not generated | 26.8 | 43.3 | ⊚ | Inventive example |

(*Out of range of the invention, —: Not applicable)

In each Table, Test Nos. 101 and 129 correspond to spot welding at standard conditions (standard conditions 1 and 2, respectively) without providing the pressurizing member and without performing post energization. Test Nos. 101 and 129 are different from each other only in load $F_c$ given by the electrode, i.e., 3000 N and 4000 N, respectively. Test Nos. 102 to 124 are each a test performed at a pressurizing condition where the total load given by the electrode and the pressurizing member is equal to the load given by the electrode of Test No. 101. Test Nos. 125 to 128 and 130 are each a test performed at a pressurizing condition where the total load given by the electrode and the pressurizing member is equal to the load given by the electrode of Test No. 129. Table 5 also shows what percent joint strength in shear, which is determined through each test performed at the same total load as that of the standard condition 1 or 2, is increased with reference to the joint strength in shear of the standard condition 1 or 2. Such increasing rate of the joint strength in shear was defined to be an evaluation index for a strength increasing effect of a spot weld joint. A test condition at which a strength increasing effect of 30% or more was shown was determined to be acceptable, and a test condition at which a strength increasing effect of 40% or more was shown was determined to be a more preferable case.

As shown in Tables 2 and 5, Test Nos. 105 to 108, 111, 112, 114, 116, and 119 to 124 are each an inventive example that satisfies all the requirements of the second invention. In each inventive example, the splash demarcation current is 8.5 kA or more, showing that the splash demarcation current is extremely higher than that (6.5 kA) of Test No. 101 (the standard condition 1). Furthermore, in each inventive example, joint strength in shear satisfies the acceptable criterion, showing that strength of each spot weld joint is extremely higher than that of Test No. 101 (the standard condition 1).

As shown in Tables 4 and 5, Test No. 130 is also an inventive example that satisfies all the requirements of the second invention. In this inventive example, the splash demarcation current is high, 11.0 kA, showing that the splash demarcation current is extremely higher than that (8.0 kA) of Test No. 129 (the standard condition 2). Furthermore, in this inventive example, joint strength in shear satisfies the acceptable criterion, showing that strength of the spot weld joint is extremely higher than that of Test No. 129 (the standard condition 2).

As shown in Tables 3 and 5, Test Nos. 125 to 128 are each an inventive example that satisfies all the requirements of the third invention. In each inventive example, the splash demarcation current is 9.5 kA, showing that the splash demarcation current is extremely higher than that (8.0 kA) of Test No. 129 (the standard condition 2). Furthermore, in each inventive example, joint strength in shear satisfies the acceptable criterion, showing that strength of the spot weld joint is extremely higher than that of Test No. 129 (the standard condition 2).

In contrast, Test Nos. 102 to 104, 109, 110, 113, 115, 117, and 118 are each a comparative example that does not satisfy at least one of the requirements of the second invention.

In Test No. 102, the pressurizing member was not provided, the welding current was adjusted to be equal to the splash demarcation current, and post energization was performed. However, since the electrode periphery was not pressurized by the pressurizing member, the splash demarcation current was as low as that of the standard condition 1, and the welding current was not allowed to be sufficiently increased, and therefore the increasing effect of joint strength in shear was insufficient.

In Test No. 103, the pressurizing member was also not provided, the welding current was adjusted to be higher than the splash demarcation current, and post energization was performed. However, since expulsion at edge was generated during the main energization, the increasing effect of joint strength in shear was also insufficient.

In Test No. 104, the pressurizing member was provided and the electrode periphery was pressurized by the pressurizing member to extremely increase the splash demarcation current compared with that of the standard condition 1, and only the main energization was performed while the welding current was adjusted to be substantially equal to the splash demarcation current. In Test No. 104, however, since the post energization was not performed, the increasing effect of joint strength in shear was also insufficient.

In Test No. 109, the pressurizing member was provided and the electrode periphery was pressurized by the pressurizing member to extremely increase the splash demarcation current compared with that of the standard condition 1, and the main energization was performed while the welding current was adjusted to be substantially equal to the splash demarcation current. In Test No. 109, post energization was then performed, but the post energization current was excessively high; hence, the increasing effect of joint strength in shear was also insufficient.

In Test No. 110, the pressurizing member was provided and the electrode periphery was pressurized by the pressurizing member to extremely increase the splash demarcation current compared with that of the standard condition 1, and the main energization was performed while the welding current was adjusted to be substantially equal to the splash demarcation current. In Test No. 110, post energization was then performed, but the post energization time was excessively long; hence, the increasing effect of joint strength in shear was also insufficient.

In Test No. 113, the pressurizing member was provided, and while the electrode periphery was pressurized by the pressurizing member, the main energization and the post energization were performed at the conditions defined in the second invention. In Test No. 113, however, since the load given by the pressurizing member was excessively high, the splash demarcation current was not allowed to be significantly increased compared with that of the standard condition 1, and thus the welding current was failed to be sufficiently increased, so that the increasing effect of joint strength in shear was insufficient.

In Test No. 115, the pressurizing member was provided, and while the electrode periphery was pressurized by the pressurizing member, the main energization and the post energization were performed at the conditions defined in the second invention. In Test No. 115, however, since the distance c from the outer perimeter of the electrode tip to the pressurizing member was excessively large, the splash demarcation current was not allowed to be increased compared with that of the standard condition 1, and thus the welding current was failed to be sufficiently increased, so that the increasing effect of joint strength in shear was insufficient.

In Test No. 117, the pressurizing member was provided, and while the electrode periphery was pressurized by the pressurizing member, the main energization and the post energization were performed at the conditions defined in the second invention. In Test No. 117, however, since the total area of regions pressurized by the pressurizing member was insufficient, the splash demarcation current was not allowed to be significantly increased compared with that of the standard condition 1, and thus the welding current was failed to be sufficiently increased, so that the increasing effect of joint strength in shear was insufficient.

In Test No. 118, the pressurizing member was provided, and while the electrode periphery was pressurized by the pressurizing member, the main energization and the post energization were performed at the conditions defined in the second invention. In Test No. 118, however, since the largest continuous region being not pressurized by the pressurizing member was excessively large, the splash demarcation current was not allowed to be increased compared with that of the standard condition 1, and thus the welding current was failed to be sufficiently increased, so that the increasing effect of joint strength in shear was insufficient.

As clearly seen from the above results, it is confirmed that it is possible to easily and securely prevent splash generation without need of complicated control by using the spot welding method according to each of the second and third inventions. It is further confirmed that the splash demarcation current is extremely increased, and thus the optimum current range of spot welding is allowed to be expanded, and consequently strength of the spot weld joint is extremely increased.

Although some embodiments of the invention have been described hereinbefore, the invention should not be limited thereto, and various modifications or alterations thereof may be made within the scope of the disclosure described in claims. The present application is based on Japanese patent application (JP-2012-146480) filed on Jun. 29, 2012, the content of which is hereby incorporated by reference.

LIST OF REFERENCE SIGNS

1 . . . electrode
2 . . . pressurizing member
3 . . . metal sheet (steel sheet)
21 . . . thick steel sheet
22 . . . electrode passing hole
23 . . . projection
24 . . . bolt hole
25 . . . bolt
26 . . . nut

The invention claimed is:

1. A spot welding method of joining two or more stacked metal sheets together, the method comprising:
joining a stacked section of the metal sheets together by clamping two opposite sides of the stacked section by a pair of electrodes of a spot welding machine, at a load of 100 N or more,
pressurizing the stacked section at a periphery of each of the electrodes by pressing a pressurizing member onto the two opposite sides of the stacked section at a load of 5% to 1000% of the load given by the pair of electrodes, wherein the pressurizing member is a member separate from the electrodes and configured to be in contact with two sides of the stacked section and to pressurize the stacked section in a region corresponding to 20% or more of an entire circumferential region of a tip of each of the electrodes at a distance of 5 mm or less from an outer perimeter of the tip of the electrode, wherein a continuous unpressurized region occupies 30% or less (including 0%) of the entire circumferential region of the tip of the electrode, and applying a welding current to the stacked section by the electrodes.

2. A spot welding method of joining two or more stacked steel sheets together, the method comprising:

clamping a stacked section of the metal sheets by a pair of electrodes of a spot welding machine, at a load of 100 N or more, and pressurizing the stacked section at a periphery of each of the electrodes by pressing a pressurizing member onto two opposite sides of the stacked section at a load of 5% to 1000% of the load given by the pair of electrodes, wherein the pressurizing member is a member separate from the electrodes and configured to be in contact with two sides of the stacked section and to pressurize the stacked section in a region corresponding to 20% or more of an entire circumferential region of a tip of each of the electrodes at a distance of 5 mm or less from an outer perimeter of the tip of the electrode, wherein a continuous unpressurized region occupies 30% or less (including 0%) of the entire circumferential region of the tip of the electrode;

energizing the stacked section for welding by applying a welding current between the electrodes;

taking energization standby time satisfying Formula (1) immediately after the energizing the stacked section; and following the taking energization standby time, post-energizing the stacked section by the electrodes such that Formulas (2) and (3) are satisfied, wherein Formula (1) is: $0 \leq WT \leq 200$;

wherein Formula (2) is: $0.20 \times WC \leq PC \leq 0.90 \times WC$;

wherein Formula (3) is: $10 \leq PT \leq 200$; and wherein WC represents welding current (kA), WT represents energization standby time (ms), PC represents post energization current (kA), and PT represents post energization time (ms).

3. A spot welding method of joining two or more stacked steel sheets together, the method comprising:

clamping a stacked section of the metal sheets by a pair of electrodes of a spot welding machine at a load of 100 N or more, and pressurizing the stacked section at a periphery of each of the electrodes by pressing a pressurizing member onto two opposite sides of the stacked section at a load of 5% to 1000% of the load given by the pair of electrodes, wherein the pressurizing member is a member separate from the electrodes and configured to be in contact with two sides of the stacked section and to pressurize the stacked section in a region corresponding to 20% or more of an entire circumferential region of a tip of each of the electrodes at a distance of 5 mm or less from an outer perimeter of the tip of the electrode, wherein a continuous unpressurized region occupies 30% or less (including 0%) of the entire circumferential region of the tip of the electrode;

energizing the stacked section for welding by applying a welding current between the electrodes; and immediately after the energizing the stacked section, repeating a combination N (N is 2 to 5) times such that Formula $TT=\Sigma(WTi+PTi) \leq 500$ is satisfied, the combination being a combination of taking energization standby time satisfying Formula $0 \leq WTi \leq 200$, and following the taking energization standby time, post-energizing the stacked section by the electrodes such that Formulas $0.20 \times WC \leq PCi \leq 0.90 \times WC$ and $10 \leq PTi \leq 200$ are satisfied, wherein i represents integer of 1 to N, WC represents welding current (kA), WTi represents ith energization standby time (ms), PCi represents ith post energization current (kA), PTi represents ith post energization time (ms), and TT represents total aftertreatment time (ms).

* * * * *